United States Patent
Kitazawa et al.

(10) Patent No.: US 9,699,414 B2
(45) Date of Patent: Jul. 4, 2017

(54) INFORMATION PROCESSING APPARATUS, INFORMATION PROCESSING METHOD, AND COMPUTER PROGRAM PRODUCT

(71) Applicants: Kazuki Kitazawa, Kanagawa (JP); Kiyoto Igarashi, Kanagawa (JP); Hiroaki Uchiyama, Kanagawa (JP); Koji Kuwata, Kanagawa (JP); Masato Takahashi, Tokyo (JP); Tomoyuki Goto, Kanagawa (JP); Nobumasa Gingawa, Kanagawa (JP)

(72) Inventors: Kazuki Kitazawa, Kanagawa (JP); Kiyoto Igarashi, Kanagawa (JP); Hiroaki Uchiyama, Kanagawa (JP); Koji Kuwata, Kanagawa (JP); Masato Takahashi, Tokyo (JP); Tomoyuki Goto, Kanagawa (JP); Nobumasa Gingawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/206,899

(22) Filed: Jul. 11, 2016

(65) Prior Publication Data
US 2017/0019636 A1  Jan. 19, 2017

(30) Foreign Application Priority Data
Jul. 14, 2015  (JP) .................. 2015-140819

(51) Int. Cl.
*H04N 7/15* (2006.01)
*H04L 29/06* (2006.01)
*H04R 3/00* (2006.01)

(52) U.S. Cl.
CPC .............. *H04N 7/15* (2013.01); *H04L 65/403* (2013.01); *H04R 3/005* (2013.01); *H04R 2430/20* (2013.01)

(58) Field of Classification Search
None
See application file for complete search history.

(56) References Cited

U.S. PATENT DOCUMENTS 5,959,667 A   9/1999  Maeng
6,618,073 B1  9/2003  Lambert et al.
(Continued)

FOREIGN PATENT DOCUMENTS

JP   H09-271006    10/1997
JP   2007-274463   10/2007

*Primary Examiner* — Creighton Smith
(74) *Attorney, Agent, or Firm* — Oblon, McClelland, Maier & Neustadt, L.L.P.

(57) ABSTRACT

An information processing apparatus includes an imaging unit, a voice input unit, a cutting-out unit, a transmitting unit, an acquiring unit, and a cutting-out control unit. The voice input unit switches a sound pickup direction for voice. The cutting-out unit cuts out, as a cut-out image, a cutting-out area which is at least a part of an image captured by the imaging unit. The transmitting unit transmits video information including the cut-out image and voice data of voice input to the voice input unit. The acquiring unit acquires setting information including layout information indicating arrangement of seat areas at a time of a conference and priority information indicating a priority of each of the seat areas indicated by the layout information. The cutting-out control unit controls the sound pickup direction of the voice input unit and the cutting-out area of the cutting-out unit in accordance with the acquired setting information.

20 Claims, 11 Drawing Sheets

(56) References Cited

U.S. PATENT DOCUMENTS

| | | |
|---|---|---|
| 7,113,201 B1 | 9/2006 | Taylor et al. |
| 7,117,157 B1 | 10/2006 | Taylor et al. |
| 2006/0187306 A1 | 8/2006 | Matsui |
| 2007/0040903 A1 | 2/2007 | Kawaguchi |
| 2008/0246833 A1 | 10/2008 | Yasui et al. |
| 2009/0002477 A1 | 1/2009 | Cutler |
| 2009/0046139 A1 | 2/2009 | Cutler et al. |
| 2009/0147942 A1 | 6/2009 | Culter |
| 2010/0039497 A1 | 2/2010 | Cutler |
| 2010/0123770 A1 | 5/2010 | Friel et al. |
| 2011/0285807 A1 | 11/2011 | Feng |
| 2011/0285808 A1 | 11/2011 | Feng et al. |
| 2011/0285809 A1 | 11/2011 | Feng et al. |
| 2011/0313766 A1 | 12/2011 | Zhang et al. |
| 2012/0278077 A1 | 11/2012 | Zhang et al. |
| 2012/0307048 A1 | 12/2012 | Abrahamsson et al. |
| 2012/0320143 A1 | 12/2012 | Chu et al. |
| 2013/0271559 A1 | 10/2013 | Feng et al. |
| 2014/0376740 A1 | 12/2014 | Shigenaga et al. |
| 2015/0023524 A1 | 1/2015 | Shigenaga et al. |
| 2015/0046581 A1 | 2/2015 | Inoue |
| 2015/0047002 A1 | 2/2015 | Tamura |
| 2015/0071130 A1 | 3/2015 | Okuyama |
| 2015/0111566 A1 | 4/2015 | Nakamura |
| 2015/0133106 A1 | 5/2015 | Nakamura |
| 2015/0146078 A1 | 5/2015 | Aarrestad et al. |
| 2015/0149909 A1 | 5/2015 | Nakamura et al. |
| 2015/0149990 A1 | 5/2015 | Nakamura |
| 2016/0277242 A1* | 9/2016 | Sallam ................ H04L 41/0816 |

* cited by examiner

| LAYOUT ID | LAYOUT INFORMATION |
|---|---|
|  |  |
|  |  |
|  |  |
|  |  |
|  |  |
|  |  |
|  |  |

| SEAT AREA | PRIORITY |
|---|---|
| P1 | 2 |
| P2 | 1 |
| P3 | 1 |
| P4 | 0 |
| P5 | 1 |
| P6 | 1 |
| P7 | 3 |

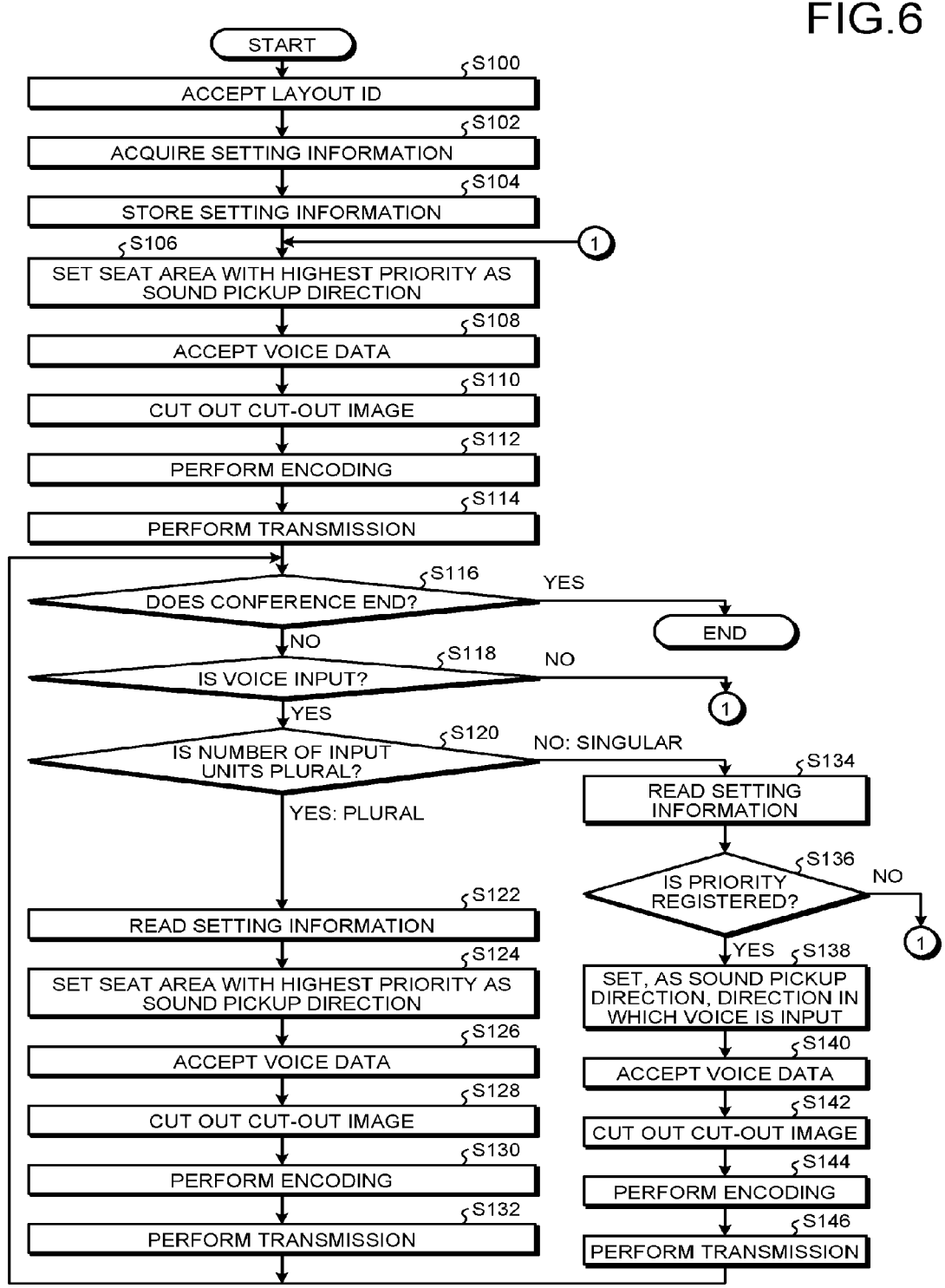

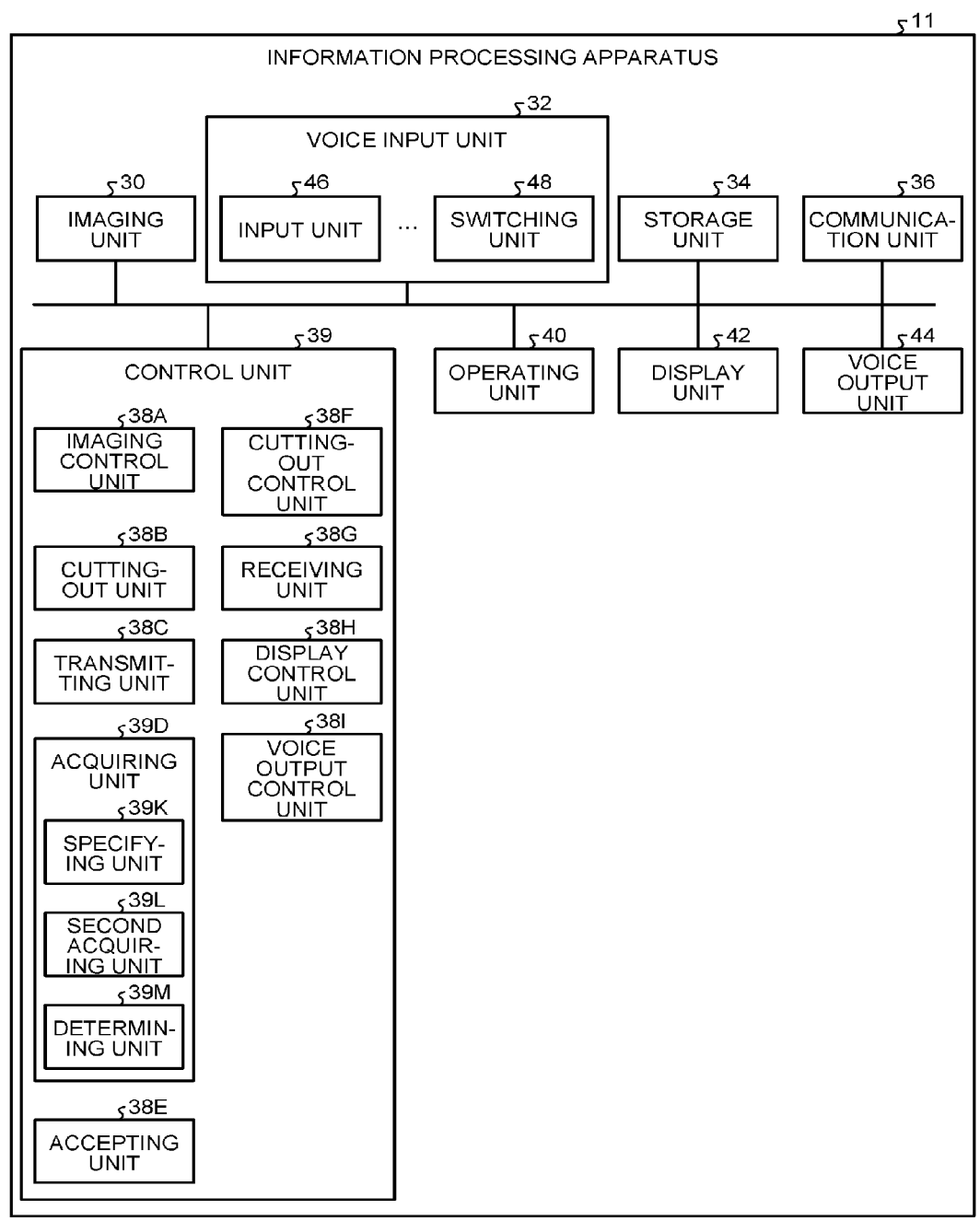

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority under 35 U.S.C. §119 to Japanese Patent Application No. 2015-140819, filed Jul. 14, 2015. The contents of which are incorporated herein by reference in their entirety.

BACKGROUND OF THE INVENTION

1. Field of the Invention

The present invention relates to an information processing apparatus, an information processing method, and a computer program product.

2. Description of the Related Art

There is a known conference system that transmits and receives images (video), voice, or the like via a network, such as the Internet, in real time to achieve communication with remote places. For example, an information processing apparatus used by a participant on one side captures an image of the participant, collects voice, such as speech, of the participant, and transmits the image and the voice to an information processing apparatus used by a participant on the other side. Then, the information processing apparatus used by the participant on the other side receives and outputs the image and the voice to implement a remote conference.

Furthermore, there is disclosed a technology that can switch a sound pickup direction by using a microphone with a directionality in order to selectively collect voice of a speaker, cut out an area including the speaker from a captured image, and transmit voice data and a cut-out image. Moreover, there is disclosed another technology that transmits voice data in a direction of a conference participant based on an arrangement pattern of the conference participant.

However, conventionally, it is difficult to reduce a processing load on an information processing apparatus and cut out an image as desired by a conference participant at the same time.

SUMMARY OF THE INVENTION

According to one aspect of the present invention, an information processing apparatus includes an imaging unit, a voice input unit, a cutting-out unit, a transmitting unit, an acquiring unit, and a cutting-out control unit. The voice input unit switches a sound pickup direction for voice. The cutting-out unit cuts out, as a cut-out image, a cutting-out area which is at least a part of an image captured by the imaging unit. The transmitting unit transmits video information including the cut-out image and voice data of voice input to the voice input unit. The acquiring unit acquires setting information including layout information indicating arrangement of seat areas at a time of a conference and priority information indicating a priority of each of the seat areas indicated by the layout information. The cutting-out control unit controls the sound pickup direction of the voice input unit and the cutting-out area of the cutting-out unit in accordance with the acquired setting information.

BRIEF DESCRIPTION OF THE DRAWINGS

FIG. 4A is a diagram illustrating an example of a data structure of layout management information;

FIG. 4B is a diagram illustrating an example of a data structure of priority information;

FIG. 6 is a flowchart illustrating an example of the flow of information processing;

FIG. 8 is a block diagram illustrating an example of an information processing apparatus according to a second embodiment;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
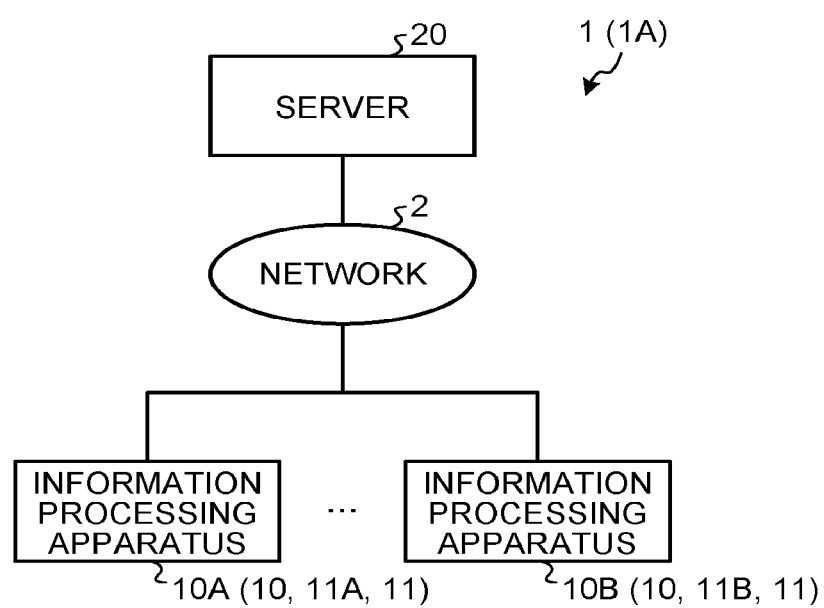
FIG. 1 is a diagram illustrating an example of a configuration of a conference system according to embodiments.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

Exemplary embodiments of an information processing apparatus, an information processing method, and an information processing program according to the present invention will be described in detail below with reference to the accompanying drawings. In the embodiments below, as one example, a case will be described in which the present invention is applied to a conference system; however, the embodiments are not limited thereto.

First Embodiment

FIG. 1 is a diagram illustrating an example of a configuration of a conference system 1 according to a first embodiment. The conference system 1 includes a plurality of information processing apparatuses 10 and a server 20. As one example, the two information processing apparatuses (an information processing apparatus 10A and an information processing apparatus 10B) are illustrated in FIG. 1. However, the number of the information processing apparatuses 10 included in the conference system 1 is not limited to two.

The information processing apparatuses 10 and the server 20 are connected to one another via a network 2. The network 2 is implemented by, for example, a local area network (LAN), the Internet, or the like.

The server 20 has a relay function to relay transmission and reception of an image, voice data, or the like between the information processing apparatuses 10. Furthermore, in addition to the relay function, the server 20 has a conference control function to control start and end of a conference or the like between the information processing apparatuses 10 that participate in the conference; however, explanation thereof is omitted herein.

The information processing apparatuses 10 are arranged in different locations, and transmit and receive video information to and from each other via the server 20. The video information includes a cut-out image (details will be described later) and voice data. In the first embodiment, it is assumed that the information processing apparatuses 10 are special terminals for a video conference. However, the information processing apparatuses 10 are not limited to this example, but may be notebook personal computers (PCs), smartphones, tablet terminals, or the like. In the following description, the information processing apparatuses 10 (the information processing apparatus 10A and the information processing apparatus 10B) may be collectively referred to as the information processing apparatus 10 when they need not be distinguished from each other.

Figure 2:
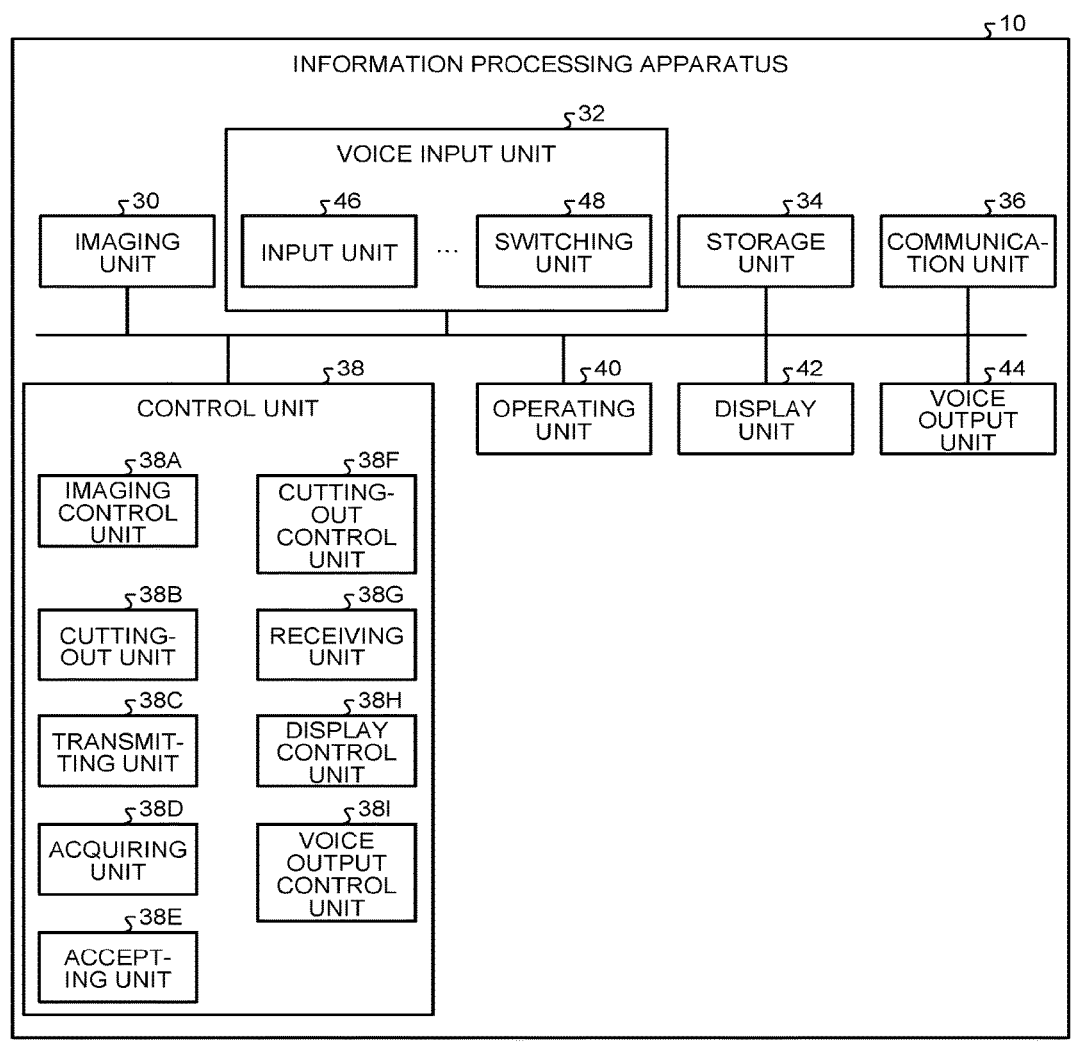
FIG. 2 is a block diagram illustrating an example of an information processing apparatus according to a first embodiment.

FIG. 2 is a block diagram illustrating an example of the information processing apparatus 10 according to the first embodiment.

The information processing apparatus 10 includes an imaging unit 30, a voice input unit 32, a storage unit 34, a communication unit 36, a control unit 38, an operating unit 40, a display unit 42, and a voice output unit 44. The imaging unit 30, the voice input unit 32, the storage unit 34, the communication unit 36, the operating unit 40, the display unit 42, and the voice output unit 44 are connected to the control unit 38 so as to be able to send and receive data and signals.

The imaging unit 30 captures an image of a conference participant who uses the information processing apparatus 10 in a conference. The imaging unit 30 is configured with an imaging element, such as a complementary metal oxide semiconductor (CMOS) or a charge coupled device (CCD), a lens, and the like. The lens may be a wide-angle lens.

Furthermore, the imaging unit 30 may have a mechanical pan-tilt-zoom (PTZ) function that can be controlled externally. In this case, the imaging unit 30 is configured such that an imaging area of the imaging unit 30 can be controlled externally. The mechanical PTZ function is a function to physically move the imaging unit 30 to perform PTZ.

In the first embodiment, a case will be described in which the imaging unit 30 is a panoramic camera that can capture images of all directions in 360°. That is, the imaging unit 30 obtains an image (panoramic image) in which all directions are captured. Therefore, the imaging unit 30 can acquire an image in which all of conference participants in a conference room where the information processing apparatus 10 is installed are captured.

The voice input unit 32 outputs a voice signal of input voice as voice data. The voice input unit 32 can switch a sound pickup direction for voice. The sound pickup direction of the voice input unit 32 is controlled by the control unit 38, and the voice input unit 32 outputs, as voice data, a voice signal of voice in the controlled sound pickup direction. That is, the directionality of the voice input unit 32 is controlled by the control unit 38.

The voice input unit 32 includes a plurality of input units 46 and a switching unit 48.

The input units 46 have directionalities in mutually different directions, and output voice signals of input voice. That is, each of the input units 46 uses a predetermined range in a different direction as a sound pickup range, and voice that occurs in the corresponding sound pickup range is input to each of the input units 46.

In the first embodiment, the input units 46 provided in the information processing apparatus 10 are arranged in a housing of the information processing apparatus 10 such that voice that occurs in a range in which the imaging unit 30 can capture an image (that is, voice of a conference attendee) can be input to any of the input units 46.

Figure 3:
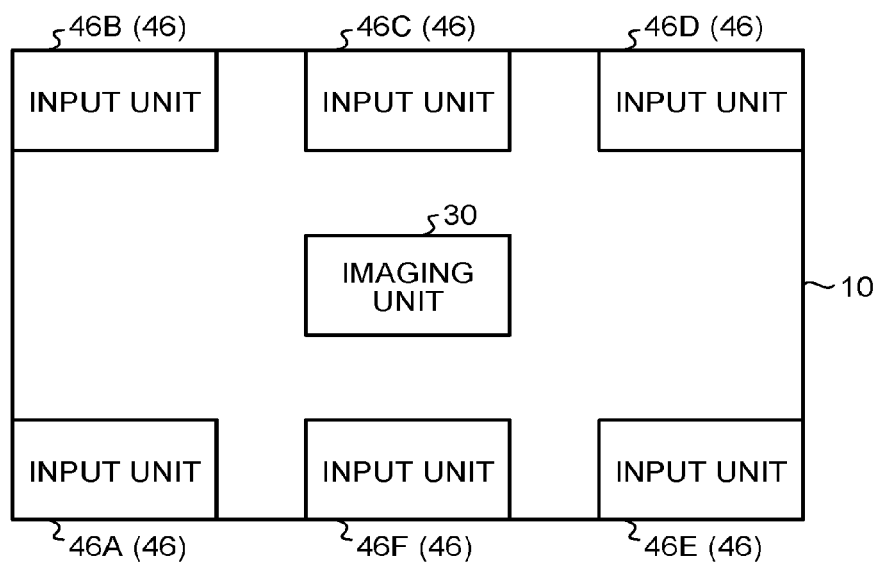
FIG. 3 is a schematic diagram illustrating an example of arrangement of a plurality of input units.

FIG. 3 is a schematic diagram illustrating an example of arrangement of the input units 46 (input units 46A to 46F) in the information processing apparatus 10. In the example illustrated in FIG. 3, the input units 46 (the input units 46A to 46F) are arranged in the housing of the information processing apparatus 10 such that a range in which the imaging unit 30 can capture an image (in the first embodiment, all directions in 360°) is covered by the entire sound pickup range of all of the input units 46.

Referring back to FIG. 2, the switching unit 48 changes a selection of the input unit 46 that outputs a voice signal used as voice data, from among the input units 46 included in the voice input unit 32. In other words, the switching unit 48 switches between enabled and disabled states of a voice signal output from each of the input units 46.

With this operation, the switching unit 48 changes the sound pickup direction of the voice input unit 32. The switching unit 48 switches to any of the input units 46 to use a voice signal output therefrom as voice data under the control of the control unit 38, and outputs, as the voice data, the voice signal output from the switched input unit 46.

Incidentally, the switching unit 48 may perform switching such that a voice signal output from at least one of the input units 46 is used as the voice data, or such that voice signals output from a plurality of the input units 46 are used as the voice data.

Specifically, if the switching unit 48 performs switching to select a specific one of the input units 46, a direction of the directionality of the selected input unit 46 is controlled as the sound pickup direction. Furthermore, if the switching unit 48 performs switching to select all of the input units 46 included in the voice input unit 32, directions of the directionalities of all of the input units 46 included in the voice input unit 32 (that is, all directions) are controlled as the sound pickup directions (that is, in this case, omnidirectional). The control unit 38 controls which direction is to be used as the sound pickup direction.

Moreover, when the switching unit 48 outputs, as the voice data, voice signals output from a plurality of the input units 46, the switching unit 48 uses, as the voice data, a signal in which a plurality of the voice signals output from the respective input units 46 are integrated.

A concept of an operation performed by the voice input unit 32 in which the input units 46 are arranged will be described below.

First, a microphone array (corresponding to the input unit 46) in which eight microphones are arrayed in a line will be described as an example. In a microphone array device, it is possible to control the directionality by causing a delay device (a plurality of the delay devices are provided for each of the microphones) to add a delay to an acoustic signal output from each of the microphones, and causing an adder to add the acoustic signals to which the delays are added. Spot1 is a principal focal point, which is a position in a space set to collect an acoustic signal from a sound source. Spot2 (on the left side of the principal focal point) and Spot3 (on the right side of the principal focal point) are detection focal points, which are positions in a space set to detect a position of the sound source.

The acoustic signal output from each of the microphones is amplified by an amplifier, and each of A-th delay devices adds a delay to the acoustic signal. Then, the acoustic signals to which the delays are added by the delay devices are added by the adder, and used as a main signal.

The amount of delay set in each of the A-th delay devices is set such that the acoustic signals that are collected by reaching the respective microphones from the principal focal point Spot1 have the same phases when the acoustic signals are added by an adder X. Consequently, the acoustic signals that reach the respective microphones from the principal focal point Spot1 are intensified.

In contrast, acoustic signals that come from directions different from the principal focal point Spot1 are collected with time lags differently from the acoustic signals that come from the principal focal point Spot1. Therefore, the acoustic signals do not have the same phases even when they are added after being collected by the respective microphones, and an intensifying effect is lower than that of the acoustic signals coming from the principal focal point Spot1. As a result, the directionality with high sensitivity to the direction of the principal focal point Spot1 is generated.

Subsequently, acoustic signals to which delays are added by respective B-th delay devices are added by an adder Y, and used as a detection signal Out2. The amount of delay set in each of the B-th delay devices is set such that the acoustic signals that reach the respective microphones from the detection focal point Spot2 and are collected have the same phases when the acoustic signals are added by the previous different adder. For example, the position of the detection focal point Spot2 is set on the right side of the principal focal point Spot1 when viewed from the microphone array.

In contrast, acoustic signals to which delays are added by respective C-th delay devices are added by an adder Z, and used as a detection signal Out3. The amount of delay set in each of the C-th delay devices is set such that the acoustic signals that are collected by reaching the respective microphones from the detection focal point Spot3 have the same phases when the acoustic signals are added by the adder Z. The position of the detection focal point Spot3 is set on the left side of the principal focal point Spot1 when viewed from the microphone array.

The detection focal points Spot2 and Spot3 are set so as to be line symmetric with respect to a segment L1 connecting a midpoint C of the microphone array and the principal focal point Spot1. That is, an angle between the segment L1 and a segment L2 connecting the midpoint C and the detection focal point Spot2 and an angle between the segment L1 and a segment L3 connecting the midpoint C and the detection focal point Spot3 are zero.

For example, when a sound source is located in a direction of the principal focal point Spot1, a main signal is maximized, and when the sound source is moved to the left side or the right side, a level of a main signal Out1 is reduced. In contrast, the detection signals Out2 and Out3 are at the same level when the sound source is located in the direction of the principal focal point Spot1. If the sound source is moved in a negative direction (toward Spot2), the detection signal Out3 is reduced and the detection signal Out2 is increased, and when the sound source is moved in a positive direction (toward Spot3), the detection signal Out2 is reduced and the detection signal Out3 is increased. Therefore, by detecting a difference between the level of the detection signal Out2 and the level of the detection signal Out3, it is possible to detect a direction of the sound source.

As described above, the direction of the sound source is detected based on a difference between the level of the detection signal Out2 and the level of the detection signal Out3, and a first directionality for collecting voice is given in the direction of the sound source. Therefore, even when the sound source is moved, it is possible to collect voice from the sound source. Furthermore, at the same time the direction of the first directionality (the principal focal point Spot1) is changed in accordance with the direction of the sound source, directions of a second directionality (the detection focal point Spot2) and a third directionality (the detection focal point Spot3) for detecting the sound source are changed. Therefore, it is possible to optimize sensitivity to detect the position of the sound source in accordance with the direction of the sound source.

The communication unit 36 communicates with the server 20 and the other information processing apparatuses 10 via the network 2. The communication unit 36 is, for example, a communication device, such as a network interface card (NIC) or a wireless communication device. In the first embodiment, the communication unit 36 transmits and receives video information to and from the other information processing apparatuses 10.

The operating unit 40 accepts input of various operations from a user (for example, a participant of a conference). The operating unit 40 is, for example, a mouse, a keyboard, a touch pad, a touch panel, or the like.

The display unit 42 displays various images. The display unit 42 is, for example, a liquid crystal display, a projection device, or the like. Incidentally, at least one of the display unit 42 and the operating unit 40 may be separated from the information processing apparatus 10. Furthermore, the operating unit 40 and the display unit 42 may be integrated and configured to function as a touch panel. The display unit 42 displays, for example, a cut-out image included in the video information that is received from the other information processing apparatus 10 via the communication unit 36.

The voice output unit 44 outputs voice. In the first embodiment, the voice output unit 44 outputs, for example, voice of voice data included in the video information that is received from the other information processing apparatus 10 via the communication unit 36. The voice output unit 44 is, for example, a speaker or the like.

The storage unit 34 stores therein various kinds of data. The storage unit 34 is, for example, a storage device, such as a hard disk drive (HDD), a solid state drive (SSD), a flash memory, a memory card, an optical disk, or a random access memory (RAM), which can store data magnetically, optically, or electrically.

In the first embodiment, the storage unit 34 stores therein, in advance, layout management information and priority information.

FIGS. 4A and 4B are diagrams illustrating examples of data structures of layout management information 60 and priority information 62, respectively. The layout management information 60 is information for managing layout information indicating arrangement of seat areas at the time of a conference. For example, as illustrated in FIG. 4A, the layout management information 60 is information in which a layout ID and layout information are associated with each other. Incidentally, the arrangement of the seat areas may be simply referred to as a layout in the following description.

The layout ID is identification information for identifying the layout information. The layout information is information indicating the arrangement of the seat areas at the time of a conference as described above.

Figure 5A:
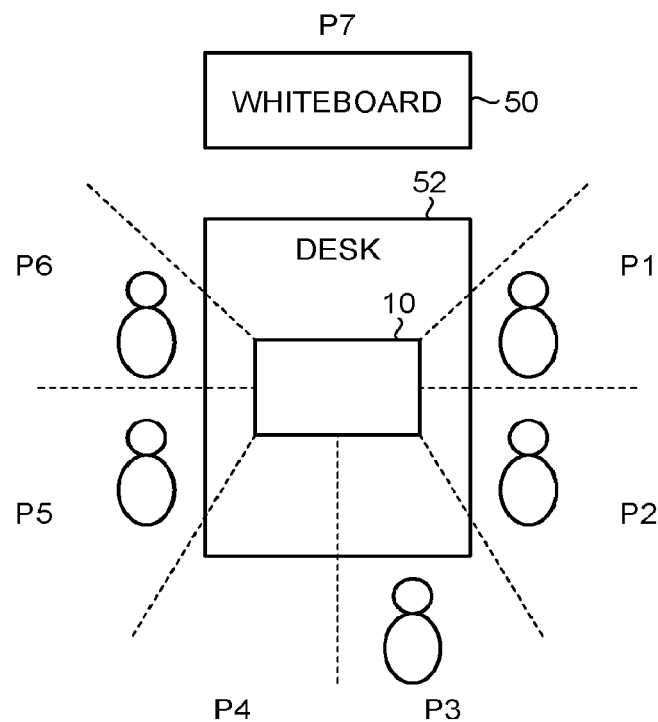
FIGS. 5A and 5B are schematic diagrams illustrating examples of the layout information.
Figure 5B:
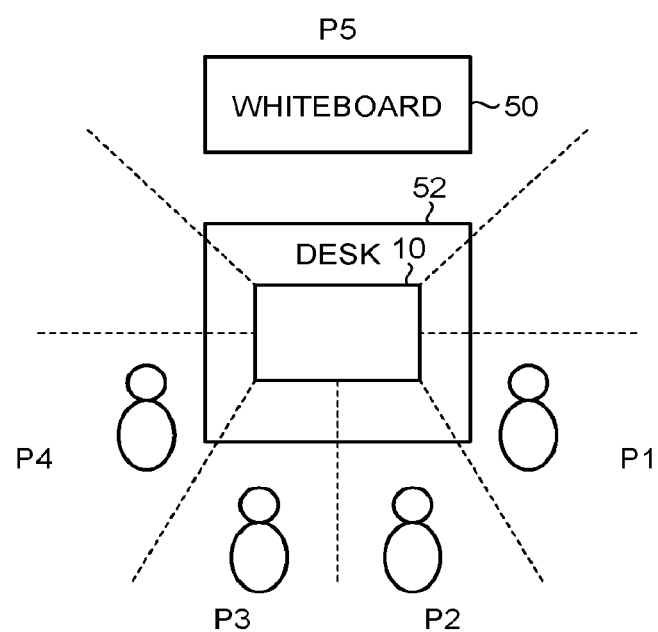

FIGS. 5A and 5B are schematic diagrams illustrating examples of the layout information. FIG. 5A is a schematic diagram illustrating an example of arrangement of seat areas P identified by a certain layout ID (for example, assumed as a pattern 1). In the layout identified by the pattern 1 as illustrated in FIG. 5A, as arrangement in which the information processing apparatus 10 is set on a desk 52 placed in the middle of a conference room, the seat areas P (seat areas P1 to P7) of conference participants are arranged around the desk 52. More specifically, the layout identified by the pattern 1 is configured such that an area on a certain side of the information processing apparatus 10 where a whiteboard 50 is installed serves as the seat area P7, and the seat areas P1 to P6 are sequentially arranged around the desk 52 in a clockwise direction in FIG. 5A.

Incidentally, the imaging unit 30 provided in the information processing apparatus 10 obtains an image (panoramic image) including the seat areas P (the seat areas P1 to P7). Therefore, the imaging unit 30 can obtain an image in which all of the conference participants located in the seat areas P are captured.

FIG. 5B is a schematic diagram illustrating an example of arrangement of seat areas identified by a certain layout ID (for example, assumed as a pattern 2). In the layout identified by the pattern 2 as illustrated in FIG. 5B, as arrangement in which the information processing apparatus 10 is set on the desk 52 placed in a conference room, the seat areas P1 to P4 are sequentially arranged around the desk 52 in an area on the opposite side of a direction in which the whiteboard is installed.

Incidentally, in the first embodiment, the seat areas P indicated by the layout information correspond to respective sound pickup ranges in directions of the directionalities of the respective input units 46 (the input unit 46A to 46F) of the information processing apparatus 10 when the information processing apparatus 10 is installed in a predetermined installation orientation.

That is, the seat areas P indicated by the layout information have one-to-one correspondence (a single seat area corresponds to a sound pickup range of the single input unit 46), one-to-many correspondence (a single seat area corresponds to sound pickup ranges of a plurality of the input units 46), or a many-to-one correspondence (a plurality of the seat areas correspond to a sound pickup range of the single input unit 46) with respect to the sound pickup ranges in the directions of the directionalities of the respective input units 46 provided in the information processing apparatus 10.

Therefore, it is preferable that the layout information is configured such that the identification information on the input unit 46 that uses each of the seat areas P as the sound pickup range (that uses a direction of each of the seat areas P with respect to the information processing apparatus 10 as the direction of the directionality) is further associated with the corresponding seat area P. In the first embodiment, it is assumed that the layout information is information in which the arrangement of the seat areas P and the identification information on the input unit 46 that uses each of the seat areas P as the sound pickup range (that is, the identification information on the input unit 46 corresponding to the seat area P) are associated with each other.

Incidentally, it may be possible to separately store, in the control unit 38, a table in which the arrangement of the seat areas P and the identification information on the input unit 46 that uses each of the seat areas P as the sound pickup range are associated with each other.

A user inputs the layout information and the identification information on the input unit 46 corresponding to each of the seat areas P in advance, and then stores the pieces of the information in the storage unit 34 in advance by operating the operating unit 40. The storage unit 34 stores the layout information, in which the arrangement of the seat areas P is associated with the identification information on the input unit 46 that uses each of the seat areas P as the sound pickup range (that is, the identification information on the input unit 46 corresponding to each of the seat areas P), in association with the layout ID (see FIG. 4A). Incidentally, the layout information may be changeable in accordance with an operation instruction through the operating unit 40 operated by a user.

Next, the priority information 62 will be described. The storage unit 34 stores the corresponding priority information 62 for each layout ID (or layout information).

FIG. 4B is a diagram illustrating an example of a data structure of the priority information 62 corresponding to the layout information (or the layout ID (pattern 1) of the layout information) illustrated in FIG. 5A.

The priority information 62 is information in which the seat area P indicated by the corresponding layout information and the priority are associated with each other.

In the example illustrated in FIG. 4B, the priority information 62 associates a corresponding priority with each of the seat areas P such as the seat areas P1 to P7. Incidentally, it may be possible to associate the same priority with a plurality of the different seat areas P.

In the example illustrated in FIG. 4B, a priority "1" indicates the highest priority, and a priority "2" and a priority "3" indicate lower priorities in this order. Furthermore, a priority "0" indicates that a priority is not registered.

The user inputs the priority information 62 corresponding to the layout information in advance, and then stores the priority information 62 in the storage unit 34 in advance by operating the operating unit 40. The storage unit 34 stores the priority information 62 in association with the layout ID (or the layout information) (see FIG. 4B). Incidentally, the priority information 62 may be changeable in accordance with an operation instruction through the operating unit 40 operated by a user.

Specifically, in the example illustrated in FIG. 4B, the priority "0" is set for the seat area P4 in the layout information illustrated in FIG. 5A by an operating instruction through the operating unit 40 operated by a user because a conference participant is not present in the seat area P. Furthermore, the priority "3" is set for the seat area P7 by an operating instruction through the operating unit 40 operated by the user because a conference participant is not present but the whiteboard 50 is installed. Moreover, the priority "1" or "2" is set for each of the seat areas P1 to P3 and the seat areas P5 and P6 because a conference participant is present in each seat area. In particular, if a moderator of the conference sits in the seat area P2, the user sets the highest priority "1" for the seat area P2 by an operating instruction through the operating unit 40.

Incidentally, the user may set the priority information 62 corresponding to each layout information in the storage unit 34 by setting the priority corresponding to each of the seat areas P by operating the operating unit 40 before the conference starts. Furthermore, various kinds of the priority information 62 may be stored in the storage unit 34 in advance, and the user may select the priority information 62 corresponding to the layout information by operating the operating unit 40 before the conference starts.

Referring back to FIG. 2, the control unit 38 controls the entire information processing apparatus 10.

The control unit 38 includes an imaging control unit 38A, a cutting-out unit 38B, a transmitting unit 38C, an acquiring unit 38D, an accepting unit 38E, a cutting-out control unit 38F, a receiving unit 38G, a display control unit 38H, and a voice output control unit 38I.

All or part of the imaging control unit 38A, the cutting-out unit 38B, the transmitting unit 38C, the acquiring unit 38D, the accepting unit 38E, the cutting-out control unit 38F, the receiving unit 38G, the display control unit 38H, and the voice output control unit 38I may be implemented by, for example, causing a processing device, such as a central processing unit (CPU), to execute a program, that is, by software, may be implemented by hardware, such as an integrated circuit (IC), or may be implemented by a combination of software and hardware.

The imaging control unit 38A controls the imaging unit 30. In the first embodiment, the imaging control unit 38A controls start and stop of imaging by the imaging unit 30, and acquires an image that is a panoramic image captured by the imaging unit 30. Incidentally, if the imaging unit 30 has a PTZ function, the imaging control unit 38A may control the PTZ function of the imaging unit 30.

The cutting-out unit 38B cuts out, as a cut-out image, a cutting-out area which is at least a part of an image captured by the imaging unit 30. That is, the cutting-out unit 38B cuts out, as the cut-out image, a predetermined cutting-out area in the panoramic image that is captured by the imaging unit 30 and acquired by the imaging control unit 38A. The cutting-out area is determined by the control of the cutting-out control unit 38F.

The transmitting unit 38C transmits video information including the cut-out image cut out by the cutting-out unit 38B and voice data of voice input to the voice input unit 32. In the first embodiment, the transmitting unit 38C encodes the video information and transmits the encoded video information to the other information processing apparatus 10. Encoding may be performed by using a well-known method. For example, a compression coding system based on H.264/AVC or H.264/SVC may be used.

The accepting unit 38E accepts various operating instructions through the operating unit 40 operated by a user. The receiving unit 38G receives various kinds of data from the other information processing apparatus 10 or the server 20 via the communication unit 36. In the first embodiment, the receiving unit 38G receives the video information from the other information processing apparatus 10 via the communication unit 36 and decodes the video information. Decoding may be performed by using a well-known method.

The display control unit 38H controls display of various images on the display unit 42. The voice output control unit 38I controls output of voice of various kinds of voice data to the voice output unit 44.

In the first embodiment, the display control unit 38H displays, on the display unit 42, the cut-out image included in the video information received by the receiving unit 38G. At this time, the voice output control unit 38I outputs, from the voice output unit 44, voice of the voice data included in the video information.

Therefore, the information processing apparatus 10 can output the cut-out image and the voice corresponding to the video information transmitted from the other information processing apparatuses 10. Furthermore, the transmitting unit 38C of the information processing apparatus 10 transmits video information generated by the own information processing apparatus 10 to the other information processing apparatus 10.

Therefore, the conference participant can obtain information on a conference participant present in a location where the other information processing apparatus 10 is installed, by viewing the image (cut-out image) displayed on the display unit 42 and listening the voice output from the voice output unit 44. Furthermore, video information corresponding to the conference participant present in the location where the information processing apparatus 10 is installed is transmitted to the other information processing apparatus 10. Therefore, the conference system 1 can realize a conference system that implements communication between remote places.

The acquiring unit 38D acquires setting information including the layout information indicating arrangement of the seat areas P at the time of a conference and the priority information 62 indicating the priority of each of the seat areas P indicated by the layout information. In the first embodiment, the acquiring unit 38D acquires, as the setting information, the layout information accepted from the operating unit 40 operated by the user and the priority information 62 corresponding to the layout information read from the storage unit 34.

For example, the user inputs the layout ID indicating a layout of a conference room by operating the operating unit 40. For example, the display control unit 38H displays a list of layout IDs stored in the control unit 38 on the display unit 42. At this time, the display control unit 38H may display the layout information corresponding to the layout ID in the layout management information 60, in accordance with the display unit 42.

Then, the user selects the layout information (or the layout ID) indicating the arrangement of the seat areas at the time of the conference from among the layout IDs displayed on the display unit 42, by operating the operating unit 40. The acquiring unit 38D reads, from the storage unit 34, the priority information 62 corresponding to the layout ID (or the layout information) accepted by the accepting unit 38E through the operating unit 40, to thereby acquire the priority information 62. Furthermore, the acquiring unit 38D acquires, as the setting information, the layout information corresponding to the layout ID accepted from the operating unit 40, and the read priority information 62.

The acquiring unit 38D that has acquired the setting information stores the acquired setting information as setting information used for the conference in the storage unit 34.

The cutting-out control unit 38F controls the sound pickup direction of the voice input unit 32 and the cutting-out area of the cutting-out unit 38B in accordance with the setting information acquired by the acquiring unit 38D. That is, the cutting-out control unit 38F controls the sound pickup direction of the voice input unit 32 and the cutting-out area of the cutting-out unit 38B by using the layout information and the priority information 62.

In the first embodiment, the cutting-out control unit 38F performs first control.

More specifically, the cutting-out control unit 38F sets, as the sound pickup direction, a direction of the seat area P with the highest priority indicated by the priority information 62 included in the setting information acquired by the acquiring unit 38D. Specifically, the cutting-out control unit 38F reads, from the storage unit 34, the setting information used for the conference stored by the acquiring unit 38D. Then, the cutting-out control unit 38F sets the sound pickup direction by using the read setting information.

For example, if the setting information includes the priority information 62 illustrated in FIG. 4B, the cutting-out control unit 38F sets directions of the seat areas P (the seat area P2, the seat area P3, the seat area P5, and the seat area P6) with the highest priority (for example, the priority "1") as the sound pickup directions.

Then, the cutting-out control unit 38F controls the sound pickup direction of the voice input unit 32 so as to collect voice in the set sound pickup directions. For example, the cutting-out control unit 38F reads the identification information on the input unit 46 corresponding to each of the seat areas P indicated by the layout information included in the read setting information. Then, the cutting-out control unit 38F recognizes the identification information on the input unit 46 corresponding to the seat area P set as the sound pickup direction. Then, the cutting-out control unit 38F causes the switching unit 48 to change a selection of the input unit 46 such that a voice signal of voice input to the input unit 46 identified by the recognized identification information is used as the voice data.

For example, the switching unit 48 performs switching such that the voice signal of the voice input to the input unit 46 corresponding to each of the seat areas P (the seat area P2, the seat area P3, the seat area P5, and the seat area P6) in the directions set as the sound pickup directions is used as voice data.

Therefore, the voice input unit 32 outputs, as the voice data to the control unit 38, the voice signal output from the input unit 46 that is selected as the input unit 46 for use as the voice data from among the input units 46 included in the voice input unit 32. That is, through the first control performed by the cutting-out control unit 38F, the voice input unit 32 outputs, to the control unit 38, the voice data in which the direction of the seat area P with the highest priority indicated by the priority information included in the acquired setting information is used as the sound pickup direction.

Furthermore, the cutting-out control unit 38F controls the cutting-out area of the cutting-out unit 38B such that an area corresponding to the seat area P in the set sound pickup direction in the image (in the first embodiment, a panoramic image) captured by the imaging unit 30 is cut out as the cut-out image.

Therefore, through the first control performed by the cutting-out control unit 38F, the cutting-out control unit 38F cuts out, as the cut-out image, the direction of the seat area P with the highest priority indicated by the priority information included in the acquired setting information in the image captured by the imaging unit 30.

The transmitting unit 38C transmits, to the other information processing apparatus 10, video information including the voice data in the sound pickup direction controlled by the cutting-out control unit 38F and the cut-out image in the sound pickup direction controlled by the cutting-out control unit 38F.

Incidentally, it is preferable that the cutting-out control unit 38F performs the first control at least at a first timing before a conference starts. The first timing is, for example, a time from when power supply is started and the information processing apparatus 10 is activated to when a signal indicating a start of the conference is input by an operating instruction through the operating unit 40 operated by the user. Incidentally, the first timing may be a period from when power supply is started to when first voice is input to the input unit 46.

Furthermore, the cutting-out control unit 38F performs second control.

More specifically, when voice is input to at least two or more of the input units 46, the cutting-out control unit 38F sets, as the sound pickup direction, the direction of the seat area P with the highest priority indicated by the priority information 62 included in the setting information acquired by the acquiring unit 38D, among the directions of the directionalities of the input units 46 to which the voice is input.

For example, it is assumed that the setting information acquired by the acquiring unit 38D includes the priority information 62 illustrated in FIG. 4B. It is also assumed that voice is input to the input unit 46D and the input unit 46E among the input units 46 (the input unit 46A to 46F) provided in the information processing apparatus 10.

In this case, the cutting-out control unit 38F recognizes the seat areas P corresponding to the respective sound pickup ranges of the input unit 46D and the input unit 46E indicated by the layout information included in the acquired setting information. Then, among the recognized seat areas P (for example, the seat area P1 and the seat area P2), the cutting-out control unit 38F sets, as the sound pickup direction, the direction of the seat area P with the highest priority (for example, the seat area P2).

Then, the cutting-out control unit 38F controls the sound pickup direction of the voice input unit 32 so as to collect voice in the set sound pickup direction. For example, the cutting-out control unit 38F reads, from the storage unit 34, the identification information on the input unit 46 corresponding to each of the seat areas P in the layout information included in the read setting information. Then, the cutting-out control unit 38F recognizes the identification information on the input unit 46 corresponding to the seat area P set as the sound pickup direction (for example, the seat area P2). Then, the cutting-out control unit 38F causes the switching unit 48 to change a selection of the input unit 46 such that a voice signal of voice input to the input unit 46 (for example, the input unit 46E) identified by the recognized identification information is used as the voice data.

For example, the cutting-out control unit 38F causes the switching unit 48 to perform switching such that the voice signal of the voice input to the input unit 46 (for example, the input unit 46E) corresponding to the seat area P (the seat area P2) in the direction set as the sound pickup direction is used as the voice data.

Therefore, through the second control performed by the cutting-out control unit 38F, the voice input unit 32 outputs, to the control unit 38, the voice data in which the direction of the seat area P with the highest priority indicated by the priority information included in the acquired setting information is used as the sound pickup direction among the directions of the directionalities of the input units 46 to which the voice is input.

Furthermore, the cutting-out control unit 38F controls the cutting-out area of the cutting-out unit 38B such that an area corresponding to the seat area P in the set sound pickup direction in the image (in the first embodiment, a panoramic image) captured by the imaging unit 30 is cut out as the cut-out image.

Therefore, through the second control performed by the cutting-out control unit 38F, the cutting-out control unit 38F cuts out, as the cut-out image, the direction of the seat area P with the highest priority indicated by the priority information included in the acquired setting information in the image captured by the imaging unit 30, among the directions of the directionalities of the input units 46 to which the voice is input.

The transmitting unit 38C transmits, to the other information processing apparatus 10, video information including the voice data in the sound pickup direction controlled by the cutting-out control unit 38F and the cut-out image in the sound pickup direction controlled by the cutting-out control unit 38F.

Incidentally, it is preferable that the cutting-out control unit 38F performs the second control or third control (to be described later) after the first timing. That is, it is preferable that the cutting-out control unit 38F performs the second control or the third control after the conference has started.

Furthermore, the cutting-out control unit 38F performs the third control.

More specifically, when voice is input to any one of the input units 46 included in the voice input unit 32, and if a priority corresponding to the seat area P in the direction of the directionality of the input unit 46 to which the voice is input is not registered in the priority information 62, the cutting-out control unit 38F performs the first control.

Furthermore, when voice is input to any one of the input units 46 included in the voice input unit 32, and if a priority corresponding to the seat area P in the direction of the directionality of the input unit 46 to which the voice is input is registered in the priority information 62, the cutting-out control unit 38F sets the direction of the directionality of the input unit 46 to which the voice is input as the sound pickup direction.

Then, the cutting-out control unit 38F controls the voice input unit 32 so as to collect voice in the set sound pickup direction. Furthermore, the cutting-out control unit 38F controls the cutting-out area of the cutting-out unit 38B such that an area corresponding to the seat area P in the set sound pickup direction in the image (in the first embodiment, a panoramic image) captured by the imaging unit 30 is cut out as the cut-out image.

Therefore, through the third control, when the priority corresponding to the seat area P in the direction of the directionality of the input unit 46 to which the voice is input is registered in the priority information 62 included in the setting information, the cutting-out control unit 38F sets, as the sound pickup direction, the direction of the directionality of one of the input units 46 to which the voice is input in the image captured by the imaging unit 30, and cuts out the direction of the seat area P corresponding to the set sound pickup direction as the cut-out image.

The transmitting unit 38C transmits, to the other information processing apparatus 10, video information including the voice data in the sound pickup direction controlled by the cutting-out control unit 38F and the cut-out image in the sound pickup direction controlled by the cutting-out control unit 38F.

Next, the flow of information processing performed by the information processing apparatus 10 according to the first embodiment will be described. FIG. 6 is a flowchart illustrating an example of the flow of information processing performed by the information processing apparatus 10 to transmit the video information to the other information processing apparatus 10.

When power is supplied to the information processing apparatus 10, the accepting unit 38E accepts a layout ID from the operating unit 40 (Step S100). For example, a user inputs the layout ID of a layout of a conference room by operating the operating unit 40.

For example, the display control unit 38H displays, on the display unit 42, a list of layout IDs stored in the control unit 38. At this time, the display control unit 38H may display the layout information corresponding to the layout ID in the layout management information 60 in accordance with the display unit 42.

Then, the user selects the layout information (or the layout ID) indicating the arrangement of the seat areas at the time of the conference from among the layout IDs displayed on the display unit 42, by operating the operating unit 40. Accordingly, the accepting unit 38E accepts the layout ID.

Subsequently, the acquiring unit 38D acquires the setting information (Step S102). At Step S102, the acquiring unit 38D reads, from the storage unit 34, the layout information corresponding to the layout ID accepted at Step S100 and the priority information 62 corresponding to the layout information, to thereby acquire the setting information including the layout information and the priority information 62.

Then, the acquiring unit 38D stores the acquired setting information as setting information used for the conference in the storage unit 34 (Step S104).

Subsequently, the cutting-out control unit 38F performs the first control (Step S106 to Step S110). First, the cutting-out control unit 38F sets, as the sound pickup direction, a direction of the seat area P with the highest priority indicated by the priority information 62 included in the setting information stored in the storage unit 34 at Step S104 (Step S106).

Then, the cutting-out control unit 38F controls the voice input unit 32 so as to collect voice in the sound pickup direction set at Step S106 (Step S108). Consequently, the cutting-out control unit 38F accepts voice data of voice in the sound pickup direction set at Step S106.

Subsequently, the cutting-out control unit 38F controls the cutting-out area of the cutting-out unit 38B such that an area corresponding to the seat area P in the sound pickup direction set at Step S106 in the image (in the first embodiment, a panoramic image) captured by the imaging unit 30 is cut out as the cut-out image (Step S110). Incidentally, the description is given on the assumption that the imaging unit 30 starts to capture images and sequentially outputs the captured images (panoramic image) to the control unit 38 when power supply to the information processing apparatus 10 is started.

Through the process at Step S110, the cutting-out control unit 38F cuts out, as the cut-out image, the direction of the seat area P with the highest priority indicated by the priority information included in the setting information acquired at Step S102 in the image captured by the imaging unit 30.

Subsequently, the transmitting unit 38C encodes the voice data accepted at Step S108 and the cut-out image cut out at Step S110 (Step S112), and transmits the encoded voice data and the encoded cut-out image to the other information processing apparatus 10 (Step S114).

Then, the control unit 38 determines whether the conference ends (Step S116). For example, the control unit 38 performs the determination at Step S116 by determining whether the end of the conference is instructed by an operating instruction through the operating unit 40 operated by the user. If the determination result at Step S116 is positive (YES at Step S116), the routine is terminated.

In contrast, if the determination result at Step S116 is negative (NO at Step S116), the process proceeds to Step S118.

At Step S118, the control unit 38 determines whether voice is input to any of the input units 46 provided in the voice input unit 32 (Step S118).

If the determination result at Step S118 is negative (NO at Step S118), the process returns to the above-described Step S106. In contrast, if the determination result at Step S118 is positive (YES at Step S118), the process proceeds to Step S120.

At Step S120, the cutting-out control unit 38F determines whether the number of the input units 46, for which it is determined at Step S118 that voice has been input, is plural (Step S120). If the number of the input units 46, for which it is determined at Step S118 that voice has been input, is plural (YES at Step S120), the process proceeds to Step S122.

Then, the cutting-out control unit 38F performs the second control (Step S122 to Step S128). That is, the cutting-out control unit 38F reads setting information that is stored as the setting information used for the conference in the storage unit 34 (Step S122).

Subsequently, the cutting-out control unit 38F sets, as the sound pickup direction, the direction of the seat area P with the highest priority indicated by the priority information 62 included in the setting information read at Step S122, among the directions of the directionalities of the input units 46 for which it is determined at Step S120 that voice has been input (Step S124).

Subsequently, the cutting-out control unit 38F controls the sound pickup direction of the voice input unit 32 so as to collect voice in the sound pickup direction set at Step S124 (Step S126). Consequently, the cutting-out control unit 38F accepts voice data of voice in the sound pickup direction set at Step S124 (Step S126).

Then, the cutting-out control unit 38F controls the cutting-out area of the cutting-out unit 38B such that an area corresponding to the seat area P in the sound pickup direction set at Step S124 in the image (in the first embodiment, a panoramic image) captured by the imaging unit 30 is cut out as the cut-out image (Step S128).

Through the process at Step S128, the cutting-out control unit 38F cuts out, as the cut-out image, the direction of the seat area P with the highest priority indicated by the priority information included in the setting information acquired at Step S102 in the image captured by the imaging unit 30, among the directions of the directionalities of the input units 46 to which the voice is input.

Subsequently, the transmitting unit 38C encodes the voice data accepted at Step S126 and the cut-out image cut out at Step S128 (Step S130), and transmits the encoded voice data and the encoded cut-out image as the video information to the other information processing apparatus (Step S132). Then, the process returns to Step S116 as described above.

In contrast, in the determination at Step S120, if the cutting-out control unit 38F determines that the number of the input units 46, for which it is determined at Step S118 that the voice has been input, is singular (NO at Step S120), the process proceeds to Step S134.

Then, the cutting-out control unit 38F performs the third control (Step S134 to Step S142). More specifically, the cutting-out control unit 38F reads, as the setting information used for the conference, the setting information stored in the storage unit 34 (Step S134).

Subsequently, the cutting-out control unit 38F determines whether a priority corresponding to the seat area P in the direction of the directionality of the input unit 46 to which the voice is input is registered in the priority information 62 included in the setting information read at Step S134 (Step S136).

If it is determined that the priority is not registered (NO at Step S136), the process returns to the above-described Step S106.

In contrast, if it is determined that the priority is registered (YES at Step S136), the process proceeds to Step S138. At Step S138, the cutting-out control unit 38F sets, as the sound pickup direction, the direction of the directionality of the input unit 46 to which the voice is input (Step S138).

Then, the cutting-out control unit 38F controls the voice input unit 32 so as to collect voice in the sound pickup direction set at Step S138 (Step S140). Through the process at Step S140, the cutting-out control unit 38F accepts voice data of voice in the sound pickup direction set at Step S138.

Subsequently, the cutting-out control unit 38F controls the cutting-out area of the cutting-out unit 38B such that an area corresponding to the seat area P in the sound pickup direction set at Step S138 in the image (in the first embodiment, a panoramic image) captured by the imaging unit 30 is cut out as the cut-out image (Step S142).

Through the process at Step S142, the cutting-out control unit 38F cuts out, as the cut-out image, the direction of the directionality of the input unit 46 to which the voice is input in the image captured by the imaging unit 30.

Subsequently, the transmitting unit 38C encodes the voice data accepted at Step S140 and the cut-out image cut out at Step S142 (Step S144), and transmits the encoded voice data and the encoded cut-out image as the video information to the other information processing apparatus (Step S146). Then, the process returns to the above-described Step S116.

Figure 7:
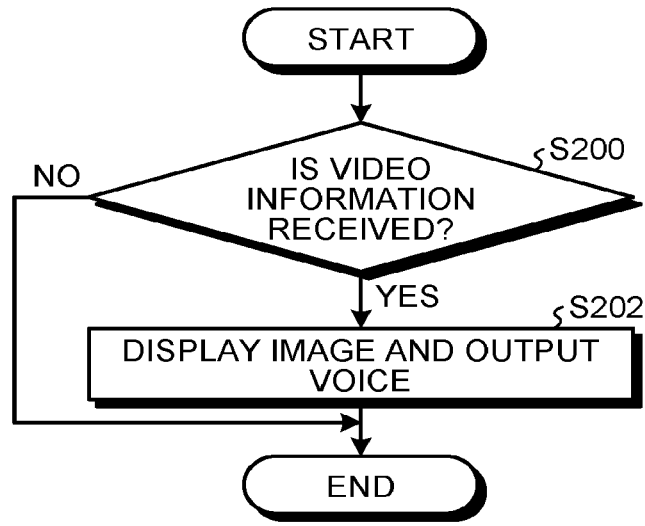
FIG. 7 is a flowchart illustrating an example of the flow of information processing.

Next, the flow of information processing performed by the information processing apparatus 10 according to the first embodiment when the video information is received from the other information processing apparatus 10 will be described. FIG. 7 is a flowchart illustrating an example of the flow of the information processing performed when the video information is received from the other information processing apparatus 10.

First, the receiving unit 38G determines whether the video information is received from the other information processing apparatus 10 via the communication unit 36 (Step S200). If the determination result at Step S200 is negative (NO at Step S200), the routine is terminated. In contrast, if the determination result at Step S200 is positive (YES at Step S200), the process proceeds to Step S202.

At Step S202, the receiving unit 38G decodes the received video information, the display control unit 38H displays the cut-out image included in the video information on the display unit 42, and the voice output control unit 38I outputs the voice data included in the video information to the voice output unit 44 (Step S202). Then, the routine is terminated.

As described above, the information processing apparatus 10 according to the first embodiment includes the imaging unit 30, the voice input unit 32, the cutting-out unit 38B, the transmitting unit 38C, the acquiring unit 38D, and the cutting-out control unit 38F. The voice input unit 32 receives input of voice and can switch a sound pickup direction for voice. The cutting-out unit 38B cuts out, as the cut-out image, the cutting-out area which is at least a part of an image captured by the imaging unit 30. The transmitting unit 38C transmits video information including the cut-out image and voice data of voice input to the voice input unit 32. The acquiring unit 38D acquires setting information including layout information indicating arrangement of the seat areas P at the time of a conference and the priority information 62 indicating a priority of each of the seat areas P indicated by the layout information. The cutting-out control unit 38F controls the sound pickup direction of the voice input unit 32 and the cutting-out area of the cutting-out unit 38B in accordance with the acquired setting information.

As described above, the information processing apparatus 10 according to the first embodiment controls the sound pickup direction of the voice input unit 32 and the cutting-out area of the cutting-out unit 38B in accordance with the layout information and the priority information.

Therefore, the information processing apparatus 10 according to the first embodiment can reduce a processing load and can simultaneously cut a cut-out image as desired by a conference participant.

For example, conventionally, cutting-out of an image of a speaker who makes a statement during a conference and control of the directionality of a microphone toward the speaker making the statement are performed dynamically. Furthermore, if the cutting-out of a cut-out image and the control of the directionality are performed in accordance with a layout, in some cases, it may be difficult to cut out a cutting-out area as the cut-out image as desired by a conference participant. For example, in some cases, an area where a conference participant is not actually present may be cut out and transmitted as the cut-out image to the other information processing apparatus 10.

In contrast, the information processing apparatus 10 according to the first embodiment controls the sound pickup direction of the voice input unit 32 and the cutting-out area of the cutting-out unit 38B in accordance with the layout information and the priority information. Therefore, the information processing apparatus 10 according to the first embodiment can reduce a processing load and can simultaneously cut out a cut-out image as desired by a conference participant.

Furthermore, the voice input unit 32 can include a plurality of the input units 46 and the switching unit 48. The input units 46 have directionalities in different directions, and output voice signals of input voice. The switching unit 48 switches the sound pickup direction by changing a selection of the input unit 46 that outputs a voice signal used as the voice data to be transmitted, from among the input units 46.

Moreover, the cutting-out control unit 38F sets, as the sound pickup direction, the direction of the seat area P with the highest priority indicated by the priority information included in the acquired setting information. Then, the cutting-out control unit 38F can perform the first control to control the sound pickup direction of the voice input unit 32 so as to collect voice in the set sound pickup direction, and to control the cutting-out area of the cutting-out unit 38B such that an area corresponding to the seat area P in the image captured by the imaging unit 30 is cut out as the cut-out image.

Furthermore, it is preferable that the cutting-out control unit 38F performs the first control at least at a first timing before a conference starts.

Moreover, when voice is input to at least two or more of the input units 46, the cutting-out control unit 38F sets, as the sound pickup direction, the direction of the seat area P with the highest priority indicated by the priority information included in the acquired setting information, among the directions of the directionalities of the input units 46 to which the voice is input. It is preferable that the cutting-out control unit 38F subsequently performs the second control to control the voice input unit 32 so as to collect voice in the set sound pickup direction, and to control the cutting-out unit 38B such that an area corresponding to the seat area P in the image captured by the imaging unit 30 is cut out as the cut-out image.

Furthermore, when voice is input to any one of the input units 46 and if the priority corresponding to the seat area P in the direction of the directionality of the input unit 46 to which the voice is input is not registered in the priority information included in the setting information, the cutting-out control unit 38F can perform the first control. Moreover, if the priority is registered in the priority information included in the setting information, the cutting-out control unit 38F sets, as the sound pickup direction, the direction of the directionality of the input unit 46 to which the voice is input. It is preferable that the cutting-out control unit 38F subsequently performs the third control to control the voice input unit 32 so as to collect voice in the set sound pickup direction, and to control the cutting-out unit 38B such that an area corresponding to the seat area P in the direction of the directionality of the input unit 46 in the image captured by the imaging unit 30 is cut out as the cut-out image.

Furthermore, the acquiring unit 38D can acquire, as the setting information, the layout information accepted from the operating unit 40 operated by the user and the priority information corresponding to the layout information read from the storage unit 34.

Moreover, the information processing method according to the first embodiment is an information processing method performed by the information processing apparatus 10 including the imaging unit 30 and the voice input unit 32 that can switch the sound pickup direction. The information processing method according to the first embodiment includes cutting out, as a cut-out image, a cutting-out area which is at least a part of an image captured by the imaging unit 30; transmitting video information including the cut-out image and voice data of voice input to the voice input unit 32; acquiring setting information including layout information indicating arrangement of seat areas at the time of a conference and priority information indicating a priority of each of the seat areas indicated by the layout information; and controlling the sound pickup direction and the cutting-out area in accordance with the acquired setting information.

Furthermore, the information processing program according to the first embodiment is an information processing program executed by a computer including the imaging unit 30 and the voice input unit 32 that can switch the sound pickup direction. The information processing program according to the first embodiment includes cutting out, as a cut-out image, a cutting-out area which is at least a part of an image captured by the imaging unit 30; transmitting video information including the cut-out image and voice data of voice input to the voice input unit 32; acquiring setting information including layout information indicating arrangement of seat areas at the time of a conference and priority information indicating a priority of each of the seat areas indicated by the layout information; and controlling the sound pickup direction and the cutting-out area in accordance with the acquired setting information.

Second Embodiment

In the above-described first embodiment, a case has been described in which the acquiring unit 38D acquires, as the setting information, the layout information accepted from the operating unit 40 operated by the user and the priority information corresponding to the layout information read from the storage unit 34.

In a second embodiment, a case will be described in which the acquiring unit 38D acquires the setting information from an image captured by the imaging unit 30.

Incidentally, components with the same functions as those of the first embodiment may be denoted by the same symbols, and detailed explanation thereof may be omitted.

FIG. 1 is a diagram illustrating an example of a configuration of a conference system 1A according to the second embodiment. The conference system 1A includes a plurality of information processing apparatuses 11 (for example, an information processing apparatus 11A and an information processing apparatus 11B) and the server 20. The information processing apparatuses 11 and the server 20 are connected to each other via the network 2. The conference system 1A is the same as the conference system 1 except that it includes the information processing apparatuses 11 instead of the information processing apparatuses 10.

FIG. 8 is a block diagram illustrating an example of the information processing apparatus 11 according to the second embodiment.

The information processing apparatus 11 includes the imaging unit 30, the voice input unit 32, the storage unit 34, the communication unit 36, a control unit 39, the operating unit 40, the display unit 42, and the voice output unit 44. The imaging unit 30, the voice input unit 32, the storage unit 34, the communication unit 36, the operating unit 40, the display unit 42, and the voice output unit 44 are connected to the control unit 39 so as to be able to send and receive data and signals. The information processing apparatus 11 is the same as the information processing apparatus 10 of the first embodiment except that it includes the control unit 39 instead of the control unit 38.

The control unit 39 controls the entire information processing apparatus 11. The control unit 39 includes the imaging control unit 38A, the cutting-out unit 38B, the transmitting unit 38C, an acquiring unit 39D, the accepting unit 38E, the cutting-out control unit 38F, the receiving unit 38G, the display control unit 38H, and the voice output control unit 38I.

All or part of the imaging control unit 38A, the cutting-out unit 38B, the transmitting unit 38C, the acquiring unit 39D, the accepting unit 38E, the cutting-out control unit 38F, the receiving unit 38G, the display control unit 38H, and the voice output control unit 38I may be implemented by, for example, causing a processing device, such as a CPU, to execute a program, that is, by software, may be implemented by hardware, such as an IC, or may be implemented by a combination of software and hardware.

The control unit 39 is the same as the control unit 38 described in the first embodiment except that it includes the acquiring unit 39D instead of the acquiring unit 38D.

The acquiring unit 39D acquires, similarly to the acquiring unit 38D, the setting information including the layout information indicating arrangement of seat areas at the time of a conference and the priority information 62 indicating the priority of each of the seat areas P indicated by the layout information.

In the second embodiment, the acquiring unit 39D includes a specifying unit 39K, a second acquiring unit 39L, and a determining unit 39M.

The specifying unit 39K specifies the layout information from an image captured by the imaging unit 30. In the second embodiment, when power is supplied to the information processing apparatus 11, the imaging unit 30 scans all directions (360°) and obtains a panoramic image. Then, the specifying unit 39K discriminates locations of persons included in the image (panoramic image) captured by the imaging unit 30, by using a well-known image analysis method, such as face recognition.

Then, the specifying unit 39K specifies, from the layout management information 60 (see FIG. 4A) stored in the storage unit 34, layout information indicating arrangement of the seat areas P most similar to the arrangement corresponding to the locations of the persons included in the image captured by the imaging unit 30.

The second acquiring unit 39L acquires, as the setting information, the layout information specified by the specifying unit 39K and the priority information (for example, the priority information 62) corresponding to the layout information read from the storage unit 34.

As described above, in the second embodiment, the acquiring unit 39D acquires the setting information by using the image captured by the imaging unit 30.

Figure 9A:
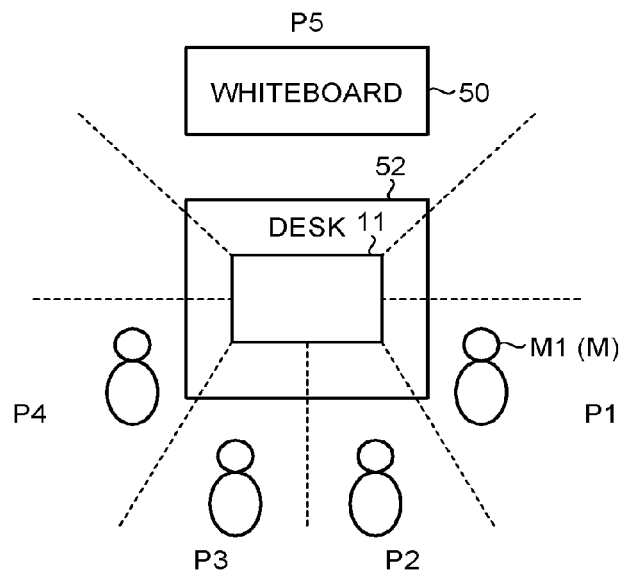
FIGS. 9A to 9C are diagrams for explaining a state in which a conference participant moves in a conference room during a conference.
Figure 9B:
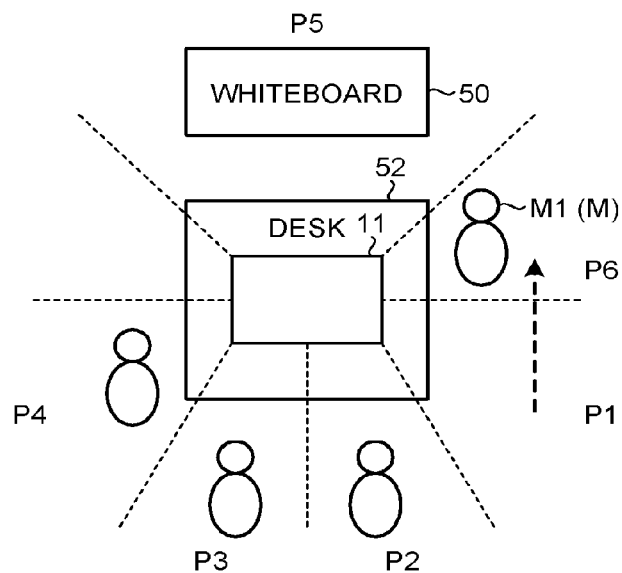
Figure 9C:
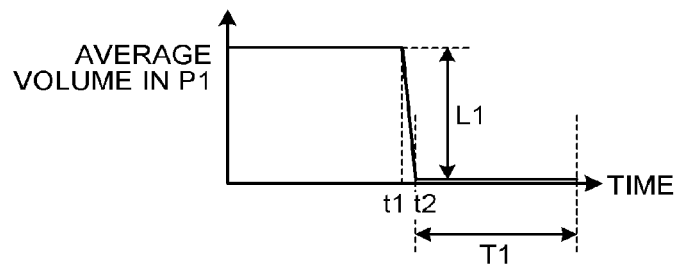

Incidentally, in some cases, a conference participant may move in a conference room during a conference. FIGS. 9A to 9C are diagrams for explaining a state in which a conference participant moves in a conference room during a conference.

As illustrated in FIG. 9A, it is assumed that a conference participant is present in each of the seat areas P1 to P5 at the beginning of the conference. However, in some cases, for example, a conference participant M (conference participant Ml) present in the seat area P1 may move to a seat area P6 during the conference (see FIG. 9B).

If the seat area P6 to which the conference participant has moved is not registered in the layout information, voice in the seat area P6 and an image of the seat area P6 may not be transmitted as the video information to the other information processing apparatus 10.

In this case, as illustrated in FIG. 9C, an average volume of the voice in the seat area P1 is reduced by a volume L1 from a time t1 because the conference participant M has moved from the seat area P1 to the seat area P6. Then, if the conference participant M is continuously absent in the seat area P1, the average volume of the voice in the seat area P1 remains low (for example, continued for a T1 time period).

Referring back to FIG. 8, therefore, the determining unit 39M determines the seat area P in which the average volume of the voice input to the voice input unit 32 is changed by an amount greater than or equal to a first threshold and thereafter the changed average volume is continued for a time longer than or equal to a second threshold. It is preferable to set, as the first threshold, a threshold for the average volume that can discriminate a change from a state in which the conference participant M is present to a state in which the conference participant M is absent. Furthermore, it is preferable to set, as the second threshold, a threshold for a duration that can determine whether a state in which the conference participant is absent is continued.

Then, it is preferable that, in the acquiring unit 39D, the specifying unit 39K specifies the layout information and the second acquiring unit 39L acquires the setting information when the determining unit 39M determines the seat area P. Consequently, it becomes possible to dynamically change the setting information when a conference participant moves during a conference.

Figure 10:
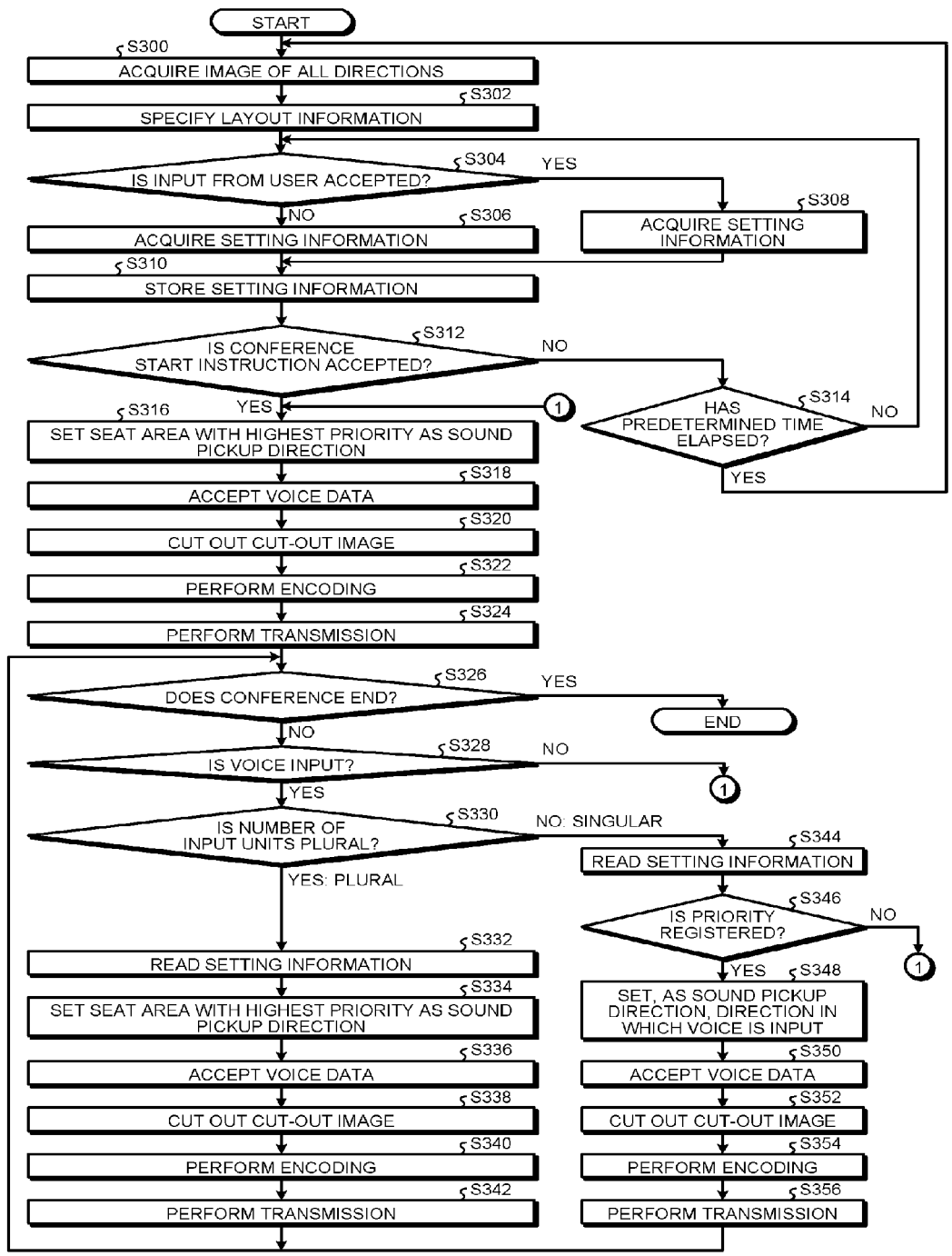
FIG. 10 is a flowchart illustrating an example of the flow of information processing.

Next, the flow of information processing performed by the information processing apparatus 11 according to the second embodiment will be described. FIG. 10 is a flowchart illustrating an example of the flow of information processing performed by the information processing apparatus 11 to transmit the video information to the other information processing apparatus 11.

When power is supplied to the information processing apparatus 11, the imaging control unit 38A scans all directions (360°), and causes the imaging unit 30 to obtain a panoramic image. Therefore, the acquiring unit 39D acquires an image of all directions (that is, a panoramic image) from the imaging unit 30 (Step S300).

Subsequently, the specifying unit 39K specifies the layout information from the image (panoramic image) acquired at Step S300 (Step S302).

Then, the control unit 39 determines whether input of the setting information is accepted by an operating instruction through the operating unit 40 operated by a user (Step S304). If the determination result at Step S304 is positive (YES at Step S304), the process proceeds to Step S308. At Step S308, similarly to the acquiring unit 38D of the first embodiment, the acquiring unit 39D acquires the setting information (Step S308). Then, the process proceeds to Step S310.

In contrast, if the determination result at Step S304 is negative (NO at Step S304), the process proceeds to Step S306. At Step S306, the second acquiring unit 39L acquires, as the setting information, the layout information specified by the specifying unit 39K at Step S302 and the priority information (for example, the priority information 62) corresponding to the layout information read from the storage unit 34 (Step S306).

Then, the acquiring unit 39D stores the setting information acquired at Step S306 or Step S308, as the setting information used for the conference, in the storage unit 34 (Step S310).

Subsequently, the accepting unit 38E determines whether a conference start instruction indicating a start of the conference is accepted from the operating unit 40 (Step S312). The user inputs the conference start instruction by operating the operating unit 40. The operating unit 40 outputs the input conference start instruction to the control unit 39. Then, the accepting unit 38E performs determination at Step S312 by determining whether the conference start instruction is accepted from the operating unit 40.

If the determination result at Step S312 is negative (NO at Step S312), the process proceeds to Step S314. At Step S314, the control unit 39 determines whether a predetermined time has elapsed since acquisition of the previous setting information (Step S314).

For example, if the predetermined time has elapsed without acceptance of the conference start instruction since the acquisition of the setting information at Step S306 or Step S308, the layout of the seat areas P may be changed. Therefore, it is preferable that the control unit 39 performs the determination at Step S314.

If the determination result at Step S314 is negative (NO at Step S314), the process returns to the above-described Step S304. If the determination result at Step S314 is positive (YES at Step S314), the process returns to Step S300.

In contrast, if the determination result at Step S312 is positive (YES at Step S312), the control unit 39 performs the processes at Step S316 to Step S356, similarly to Step S106 to Step S146 of the first embodiment (see FIG. 6). If the determination result at Step S326 is positive (YES at Step S326), the routine is terminated.

Next, interrupt processing performed in the flow of the information processing illustrated in FIG. 10 will be described.

Figure 11:
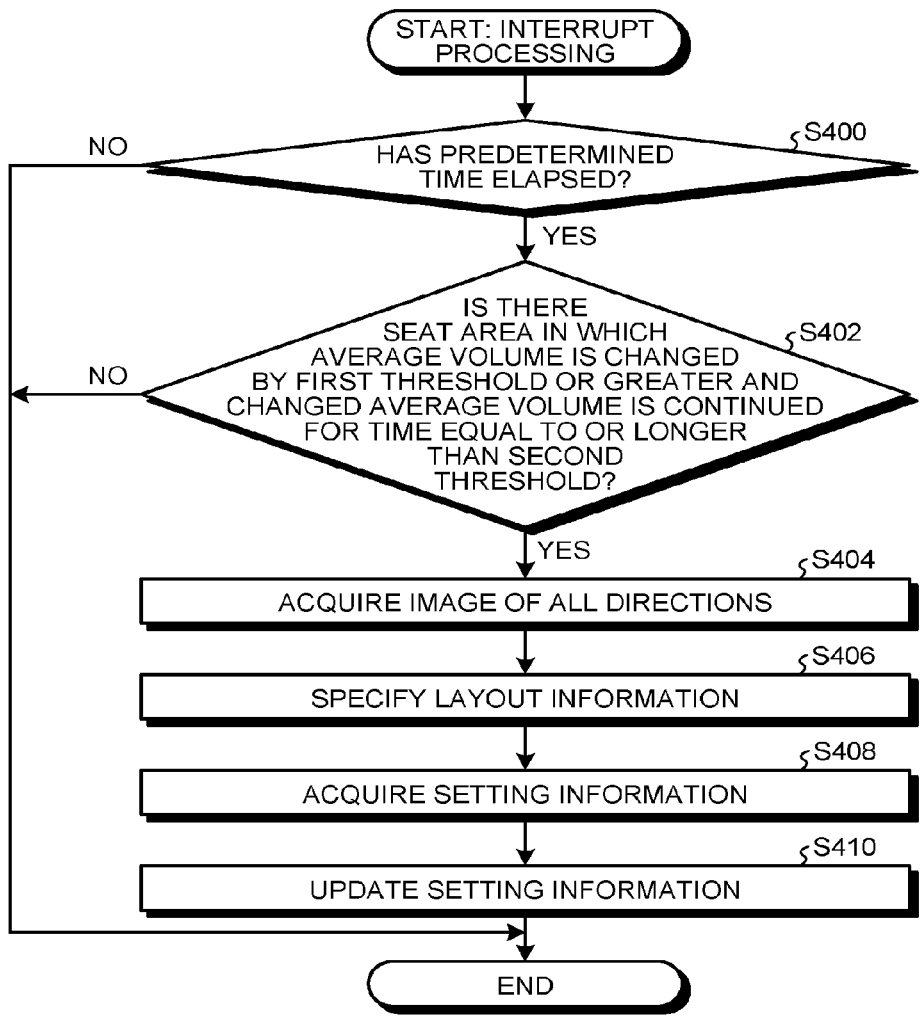
FIG. 11 is a flowchart illustrating an example of the flow of interrupt processing.

FIG. 11 is a flowchart illustrating an example of the flow of the interrupt processing performed by the control unit 39 during the information processing illustrated in FIG. 10.

The acquiring unit 39D of the control unit 39 performs the interrupt processing illustrated in FIG. 11 after it is determined that the conference start instruction is accepted at Step S312 in FIG. 10 (YES at Step S312).

First, the acquiring unit 39D determines whether a predetermined time has elapsed since update of the previous setting information (a process at Step S410 to be described later) (Step S400). It is sufficient that the predetermined time used at Step S400 is longer than a time indicated by the above-described second threshold.

If the determination result at Step S400 is negative (NO at Step S400), the routine is terminated. In contrast, if the determination result at Step S400 is positive (YES at Step S400), the process proceeds to Step S402.

At Step S402, the determining unit 39M determines whether there is the seat area P in which the average volume of the voice input to the voice input unit 32 is changed by an amount greater than or equal to the first threshold and thereafter the changed average volume is continued for a time longer than or equal to the second threshold (Step S402).

If the determination result at Step S402 is negative (NO at Step S402), the routine is terminated. In contrast, if the determination result at Step S402 is positive (YES at Step S402), the process proceeds to Step S404.

At Step S404, the acquiring unit 39D acquires an image (that is, a panoramic image) of all directions from the imaging unit 30 (Step S404).

Subsequently, the specifying unit 39K specifies the layout information from the image (panoramic image) acquired at Step S404 (Step S406). Then, the second acquiring unit 39L acquires, as the setting information, the layout information specified by the specifying unit 39K at Step S406 and the priority information corresponding to the layout information read from the storage unit 34 (Step S408).

Subsequently, the acquiring unit 39D stores the setting information acquired at Step S408 as the setting information used for the conference, to thereby update the setting information already stored in the storage unit 34 (Step S410). Then, the routine is terminated.

Through the processes from Step S400 to Step S410, it becomes possible to dynamically change the setting information when a conference participant moves during a conference.

As described above, in the second embodiment, the acquiring unit 39D can include the specifying unit 39K and the second acquiring unit 39L. The specifying unit 39K specifies the layout information from the image captured by the imaging unit 30. The second acquiring unit 39L acquires, as the setting information, the layout information specified by the specifying unit 39K and the priority information corresponding to the layout information read from the storage unit 34.

As described above, in the information processing apparatus 11 according to the second embodiment, the acquiring unit 39D can automatically acquire the layout information and the priority information without an operating instruction through the operating unit 40 operated by a user.

Therefore, the information processing apparatus 11 according to the second embodiment can reduce time and efforts of operations of a user, in addition to realize the effects of the first embodiment.

Furthermore, in the second embodiment, the acquiring unit 39D includes the determining unit 39M. The determining unit 39M determines the seat area P, in which the average volume of the voice input to the voice input unit 32 is changed by an amount greater than or equal to the first threshold and thereafter the changed average volume is continued for a time greater than or equal to the second threshold. Then, the acquiring unit 39D can specify the layout information and acquire the setting information when the determining unit 39M determines the seat area P.

Hardware Configuration

Figure 12:
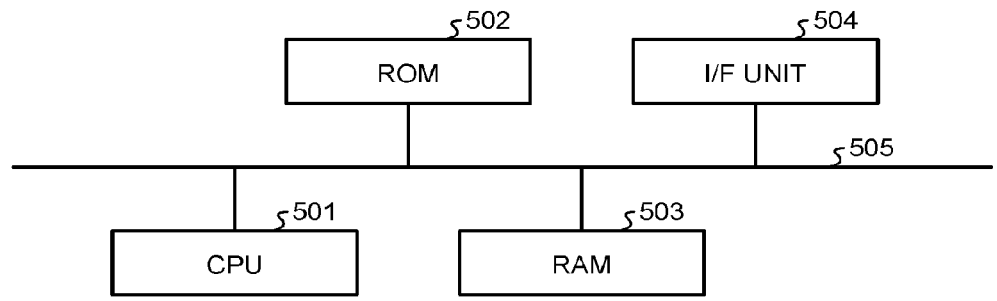
FIG. 12 is a hardware configuration diagram.

Next, a hardware configuration will be described. FIG. 12 is a hardware configuration diagram of the information processing apparatus 10, the information processing apparatus 10A, the information processing apparatus 10B, the information processing apparatus 11, the information processing apparatus 11A, the information processing apparatus 11B, and the server 20 of the above-described embodiments.

Each of the information processing apparatus 10, the information processing apparatus 10A, the information processing apparatus 10B, the information processing apparatus 11, the information processing apparatus 11A, the information processing apparatus 11B, and the server 20 includes, as a hardware configuration, a CPU 501 that controls the entire apparatus, a ROM 502 that stores therein various kinds of data or various programs, a RAM 503, and an interface unit (I/F unit) 504, all of which are connected to one another via a bus 505, and has a hardware configuration using a normal computer. A well-known display device or an operating unit, such as a keyboard, is connected to the I/F unit 504.

A program executed by each of the information processing apparatus 10, the information processing apparatus 10A, the information processing apparatus 10B, the information processing apparatus 11, the information processing apparatus 11A, the information processing apparatus 11B, and the server 20 of the above-described embodiments is provided as a computer program product by being recorded in a computer-readable recording medium, such as a compact disc-read only memory (CD-ROM), a flexible disk (FD), a compact disc-recordable (CD-R), or a digital versatile disk (DVD), in a computer-installable or computer-executable file.

Furthermore, the program executed by each of the information processing apparatus 10, the information processing apparatus 10A, the information processing apparatus 10B, the information processing apparatus 11, the information processing apparatus 11A, the information processing apparatus 11B, and the server 20 of the above-described embodiments may be stored in a computer connected to a network, such as the Internet, and may be provided by being downloaded via the network. Moreover, the program executed by each of the information processing apparatus 10, the information processing apparatus 10A, the information processing apparatus 10B, the information processing apparatus 11, the information processing apparatus 11A, the information processing apparatus 11B, and the server 20 of the above-described embodiments may be provided or distributed via a network, such as the Internet.

Furthermore, the program executed by each of the information processing apparatus 10, the information processing apparatus 10A, the information processing apparatus 10B, the information processing apparatus 11, the information processing apparatus 11A, the information processing apparatus 11B, and the server 20 of the above-described embodiments may be provided by being incorporated in a ROM or the like in advance.

The program executed by each of the information processing apparatus 10, the information processing apparatus 10A, the information processing apparatus 10B, the information processing apparatus 11, the information processing apparatus 11A, the information processing apparatus 11B, and the server 20 of the above-described embodiments has a module structure including the above-described units. As actual hardware, the above-described units are loaded on a main storage device and generated on the main storage device by causing a CPU (processor) to read the program from the above-described storage medium and execute the program.

According to an embodiment of the present invention, it is possible to reduce a processing load.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
   a camera that captures an image:
   a microphone configured to capture audio data in a sound pickup direction of the microphone; and
   processing circuitry configured to
      cut out, as a cut-out image, a cutting-out area that is at least a part of the image;
      transmit video information including the cut-out image and the audio data captured by the microphone;

acquire setting information including layout information indicating an arrangement of seat areas at a time of a conference, and priority information indicating a priority of each of the seat areas indicated by the layout information;

control, in accordance with the setting information and the priority information, an adjustment of the sound pickup direction of the microphone; and adjust the cutting-out area in accordance with the setting information and the priority information.

2. The information processing apparatus according to claim 1, wherein the microphone includes a microphone array, the microphone array including a plurality of sub-microphones with directionalities in mutually different directions and outputting audio signals of the audio data; and a switching circuit configured to switch the sound pickup direction by changing a selection of a particular sub-microphone that outputs the audio signal used as the audio data.

3. The information processing apparatus according to claim 2, wherein the processing circuitry is configured to perform a first control to control the adjustment of the sound pickup direction of the microphone such that a direction of the seat area with a highest priority indicated by the priority information included in the setting information is set as the sound pickup direction and audio data in the set sound pickup direction is collected, and adjust the cutting-out area such that an area corresponding to the seat area in the image is cut out as the cut-out image.

4. The information processing apparatus according to claim 3, wherein the processing circuitry performs the first control at least at a first timing before a conference starts.

5. The information processing apparatus according to claim 2, wherein when audio data is input to at least two or more of the sub-microphones, the processing circuitry is configured to perform a second control to control the microphone such that a direction of the seat area with a highest priority indicated by the priority information included in the setting information is set as the sound pickup direction among directions of the directionalities of the sub-microphones to which the audio data is input and such that audio data in the set sound pickup direction is collected, and adjust the cutting-out area such that an area corresponding to the seat area with the highest priority in the image is cut out as the cut-out image.

6. The information processing apparatus according to claim 3, wherein when audio data is input to any one of the sub-microphones and a priority corresponding to the seat area in a direction of a directionality of the sub-microphone to which the audio data is input is not registered in the priority information included in the setting information, the processing circuitry is configured to perform the first control, and when audio data is input to any one of the sub-microphones and the priority is registered in the priority information included in the setting information, the processing circuitry is configured to perform a third control to control the microphone such that a direction of a directionality of the sub-microphone to which the audio data is input is set as the sound pickup direction and audio data in the set sound pickup direction is collected, and adjust the cutting-out area such that an area corresponding to the seat area in the direction of the directionality of the sub-microphone in the image is cut out as the cut-out image.

7. The information processing apparatus according to claim 1, wherein the processing circuitry acquires, as the setting information, the layout information accepted from an user interface operated by a user and the priority information corresponding to the layout information read from a storage.

8. The information processing apparatus according to claim 1, wherein to acquire the setting information, the processing circuitry is configured to specify the layout information from an image captured by the camera; and acquire, as the setting information, the specified layout information and the priority information corresponding to the layout information read from a storage.

9. The information processing apparatus according to claim 8, wherein to acquire the setting information, the processing circuitry is configured to determine the seat area in which an average volume of audio data input to the microphone is changed by an amount greater than or equal to a first threshold and then the changed average volume is continued for a time longer than or equal to a second threshold, and when the seat area is determined, specify the layout information and acquire the setting information.

10. The information processing apparatus according to claim 2, wherein the camera captures an image in each of the directions of the sub-microphones.

11. An information processing method performed by an information processing apparatus that includes processing circuitry, a camera, and a microphone, the information processing method comprising:

capturing, by the microphone, audio data in a sound pickup direction of the microphone;

cutting out as a cut-out image, by the processing circuitry, a cutting-out area that is at least a part of the image;

transmitting video information including the cut-out image and the audio data;

acquiring, by the processing circuitry, setting information including layout information indicating an arrangement of seat areas at a time of a conference and priority information indicating a priority of each of the seat areas indicated by the layout information;

controlling, by the processing circuitry and in accordance with the acquired setting information, an adjustment of the sound pickup direction of the microphone; and adjusting, by the processing circuitry, the cutting-out area in accordance with the setting information and the priority information.

12. A non-transitory computer-readable medium including computer executable instructions that, when executed by processing circuitry of an information processing apparatus further including a camera and a microphone, cause the information processing apparatus to:

control the microphone to capture audio data in a sound pickup direction of the microphone;

cut out, as a cut-out image, a cutting-out area that is at least a part of the image;

transmit video information including the cut-out image and the audio data;

acquiring setting information including both layout information indicating an arrangement of seat areas at a time of a conference and priority information indicating a priority of each of the seat areas indicated by the layout information;

control, in accordance with the acquired setting information, an adjustment of the sound pickup direction of the microphone; and adjust the cutting-out area in accordance with the setting information and the priority information.

13. The information processing method according to claim 11, wherein the microphone includes
   a microphone array, the microphone array including a plurality of sub-microphones with directionalities in mutually different directions and outputting audio signals of the audio data; and
   a switching circuit configured to switch the sound pickup direction by changing a selection of a particular sub-microphone that outputs the audio signal used as the audio data.

14. The information processing method according to claim 13, further comprising:
   performing a first control to control the adjustment of the sound pickup direction of the microphone such that a direction of the seat area with a highest priority indicated by the priority information included in the setting information is set as the sound pickup direction and audio data in the set sound pickup direction is collected; and
   adjusting the cutting-out area such that an area corresponding to the seat area in the image is cut out as the cut-out image.

15. The information processing method according to claim 14, wherein the first control is performed at least at a first timing before a conference starts.

16. The information processing method according to claim 13, wherein, when audio data is input to at least two or more of the sub-microphones, the method further comprises:
   performing a second control to control the microphone such that a direction of the seat area with a highest priority indicated by the priority information included in the setting information is set as the sound pickup direction among directions of the directionalities of the sub-microphones to which the audio data is input and such that audio data in the set sound pickup direction is collected; and
   adjusting the cutting-out area such that an area corresponding to the seat area with the highest priority in the image is cut out as the cut-out image.

17. The information processing method according to claim 14, wherein
   the first control is performed when audio data is input to any one of the sub-microphones and a priority corresponding to the seat area in a direction of a directionality of the sub-microphone to which the audio data is input is not registered in the priority information included in the setting information, and
   when audio data is input to any one of the sub-microphones and the priority is registered in the priority information included in the setting information, the method further comprises:
      performing a third control to control the microphone such that a direction of a directionality of the sub-microphone to which the audio data is input is set as the sound pickup direction and audio data in the set sound pickup direction is collected, and
      adjusting the cutting-out area such that an area corresponding to the seat area in the direction of the directionality of the sub-microphone in the image is cut out as the cut-out image.

18. The information processing method according to claim 11, wherein to acquire the setting information,
   the layout information is accepted from an user interface operated by a user, and
   the priority information corresponding to the layout information is read from a storage.

19. The information processing method according to claim 11, wherein the acquiring of the setting information includes:
   specifying the layout information from an image captured by the camera; and
   acquiring, as the setting information, the specified layout information and the priority information corresponding to the layout information read from a storage.

20. The information processing method according to claim 19, wherein the acquiring of the setting information includes:
   determining the seat area in which an average volume of audio data input to the microphone is changed by an amount greater than or equal to a first threshold and then the changed average volume is continued for a time longer than or equal to a second threshold; and
   when the seat area is determined, specifying the layout information and acquiring the setting information.

* * * * *